(12) United States Patent
Shan et al.

(10) Patent No.: US 7,236,938 B2
(45) Date of Patent: Jun. 26, 2007

(54) SYSTEM AND METHOD FOR REFRESHING METRIC VALUES

(75) Inventors: Eric Shan, Saratoga, CA (US);
Ming-Chien Shan, Saratoga, CA (US);
Fabio Casati, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 559 days.

(21) Appl. No.: 10/915,810

(22) Filed: Aug. 11, 2004

(65) Prior Publication Data

US 2006/0036931 A1 Feb. 16, 2006

(51) Int. Cl.
*G06Q 10/00* (2006.01)
*G06Q 90/00* (2006.01)

(52) U.S. Cl. .................. 705/8; 700/108; 702/179; 702/182; 705/10; 705/11

(58) Field of Classification Search ............... 700/108; 705/10–11, 8; 702/179, 182; *G06Q 10/00, G06Q 90/00*
See application file for complete search history.

(56) References Cited

U.S. PATENT DOCUMENTS

| | | | |
|---|---|---|---|
| 5,276,870 A | 1/1994 | Shan et al. | |
| 5,325,525 A | 6/1994 | Shan et al. | |
| 5,334,246 A | 8/1994 | Pietrzykowski, Jr. et al. | |
| 5,412,806 A | 5/1995 | Du et al. | |
| 5,546,571 A | 8/1996 | Shan et al. | |
| 5,651,099 A | 7/1997 | Konsella | |
| 5,694,591 A | 12/1997 | Du et al. | |
| 5,732,151 A | 3/1998 | Moon et al. | |
| 5,826,239 A | 10/1998 | Du et al. | |
| 5,870,545 A | 2/1999 | Davis et al. | |
| 5,937,388 A | 8/1999 | Davis et al. | |
| 6,014,673 A | 1/2000 | Davis et al. | |
| 6,041,306 A | 3/2000 | Du et al. | |
| 6,043,816 A | 3/2000 | Williams et al. | |
| 6,078,982 A | 6/2000 | Du et al. | |
| 6,308,163 B1 | 10/2001 | Du et al. | |
| 6,463,547 B1 | 10/2002 | Bailey et al. | |
| 6,463,548 B1 | 10/2002 | Bailey et al. | |
| 6,629,108 B2 | 9/2003 | Frey et al. | |
| 6,650,955 B1 * | 11/2003 | Sonderman et al. | 700/108 |
| 6,694,109 B1 | 2/2004 | Donaldson et al. | |
| 6,697,089 B1 | 2/2004 | Bryan | |

OTHER PUBLICATIONS

Cho, Junghoo and Garcia-Molina, Hector; Effective Page Refresh Policies for Web Crawlers; ACM Transactions on Database Systems; Dec. 2003, vol. 28 Issue 4, p. 390-426.*

* cited by examiner

*Primary Examiner*—R. Stephen Dildine (57) ABSTRACT

The disclosed embodiments relate to a system and method of refreshing metrics. The method may comprise obtaining a plurality of data elements that comprise information about a process and computing a plurality of metrics from a plurality of mappings, each of the plurality of mappings relating to an operation on at least one of the plurality of data elements. Each of the plurality of metrics may have a refresh rate. Additionally, the method may comprise analyzing the refresh rate of the plurality of metrics to identify at least one shared refresh interval between groups of the plurality of metrics, identifying at least one common mapping between the plurality of metrics, and periodically refreshing the plurality of metrics, accounting for the at least one shared refresh interval and the at least one common mapping between the plurality of metrics.

23 Claims, 6 Drawing Sheets

SYSTEM AND METHOD FOR REFRESHING METRIC VALUES

BACKGROUND

Real-time monitoring may be defined as the observation of measured results approximately as they happen. In many business-related activities, real-time monitoring is a goal of significant importance. For example, real-time monitoring may be an important objective in the rapidly emerging environment of automated business solutions and zero-latency management of e-business systems.

Real-time monitoring may relate to the observation of metrics and to reports or graphs. Metrics may be defined as measurable properties or as process measurements. For example, metrics may include such things as cost (e.g., the amount of a purchase order), outcome (e.g., a positive or negative result), and duration (e.g., the time required to deliver a product). Additionally, metrics can include very complex properties such as quality, performance, and the like. Further, metrics may be represented by reports or graphs. For example, a report or graph may include a figure (e.g., a bar graph) that displays metrics relevant to an operation. Each graph or report may be derived from a single metric or a plurality of metrics.

Businesses may use various computation methods to define graphs or reports that display metrics or measured properties of a business operation in approximately real-time. These computation methods may involve the use of mapping functions or mappings. Mapping functions may be defined as business logic modules (e.g., machine-executable code) that compute each metric starting from actual or simulated execution data (e.g., operation data from a process). For example, a mapping function may be used to define how to compute a duration metric (e.g., time required to process an item) based on time-stamped data obtained during operation of a process. Such mapping functions may support more than one metric and each metric may depend on one or more mapping functions. In other words, different metrics may be computed by the same mapping and a single metric may require the execution of several mappings to determine its value. Additionally, it should be noted that computations relating to mapping and metrics inherently require a certain amount of completion time. This completion time may be referred to as a computation cost. Accordingly, a high number of calculations relating to mapping and metrics generally results in higher computation costs.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
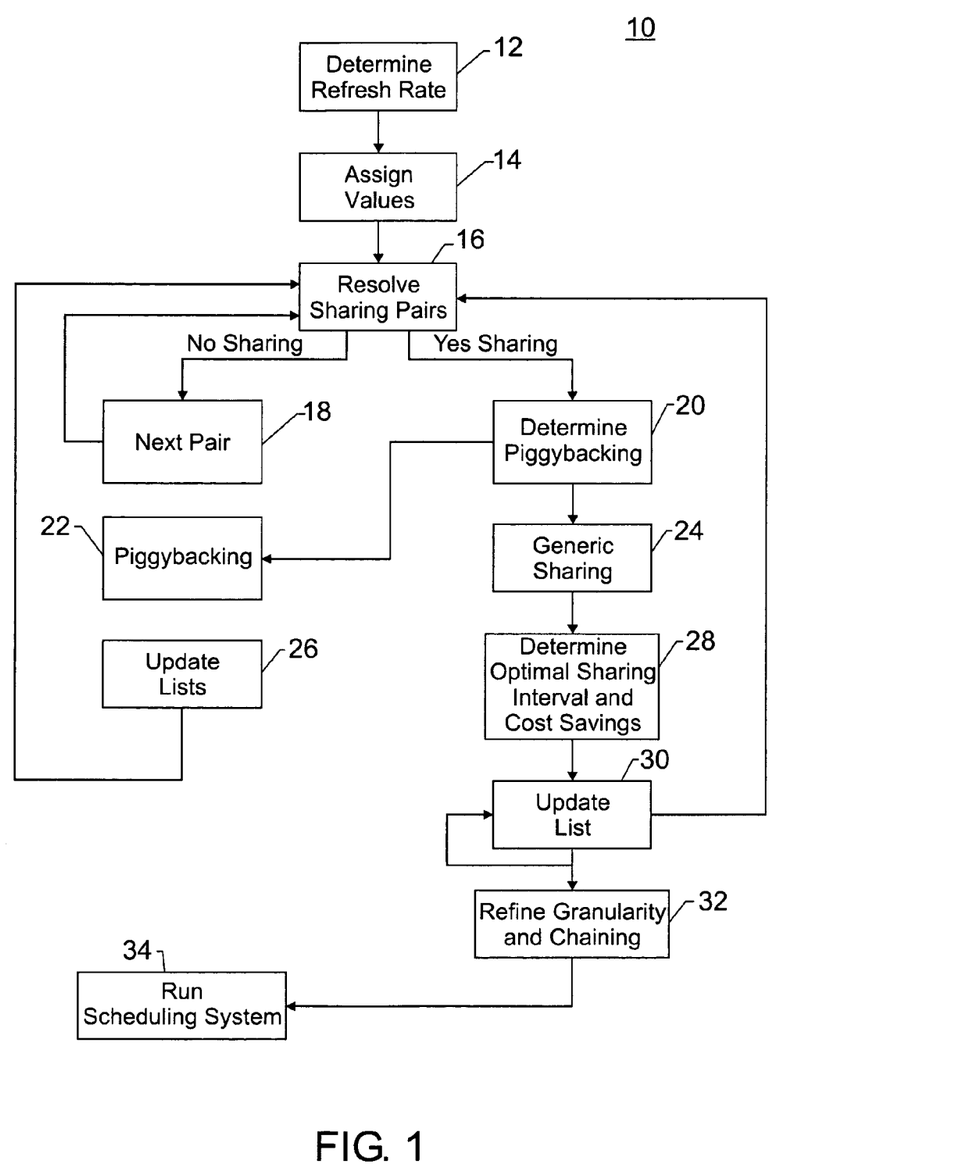
FIG. 1 is a block diagram illustrating logic flow in a scheduling algorithm for a method in accordance with embodiments of the present invention.

FIG. 1 is a block diagram illustrating logic flow in a scheduling algorithm for a method in accordance with embodiments of the present invention. This diagram is generally referred to by the reference numeral 10. While FIG. 1 separately delineates specific modules, in other embodiments, individual modules may be split into multiple modules or multiple modules may be combined into a single module. Additionally, in some embodiments of the present invention, the modules in the illustrated algorithm 10 do not necessarily operate in the illustrated order. Those skilled in the art will appreciate that the modules may comprise hardware (e.g. in a processor-based system), software or some combination of both.

A challenge of providing real-time monitoring relates to the computation of a variety of metrics and reports, each having different requirements in terms of "freshness" (i.e., how current information must be). Another challenge relating to real-time monitoring relates to the computation of a variety of metrics and reports involving the execution of complex queries over large volumes of data.

Execution of mappings that are not actually requested or needed may create an obstacle to achieving a goal of real-time monitoring. For example, all metrics in a system may be refreshed periodically by executing every mapping defined in the system, thus inhibiting provision of needed or requested metric values in real-time by spending resources and time on unnecessary calculations. Further, reports or graphs, which are each derived from a metric, may require computation along with the corresponding metric each time a report is requested. These added computations may create higher computation costs. Accordingly, report-intensive applications are often severely limited. For example, a report-intensive application may not be capable of reporting in real-time due to computation cost overhead. In fact, such applications may be limited to a point of instability (i.e., unable to meet the reporting load). In cases of high numbers of reports and high numbers of users, a system risks quickly becoming overwhelmed.

In one embodiment of the present invention, the rate of metric computation is dictated by user-specified refresh rates at a graph level or user interface. A refresh rate may be defined as the frequency with which a metric value is updated. If the graph rates are staggered, excessive refreshing can potentially occur. For example, where a metric supports one graph to be refreshed every 10 seconds and a second graph to be refreshed every 15 seconds, the metric may be computed four times every 30 seconds. Specifically, the metric may be computed once at 0 seconds for both graphs, once at 10 seconds for the first graph, once at 15 seconds for the second graph, and again at 20 seconds for the first graph.

Embodiments of the present invention may avoid excessive refreshing because of staggered graph rates by assigning the lowest refresh rate as the underlying metric's effective rate of recalculation. Accordingly, in one embodiment of the present invention, the metric in the immediate example may be computed only 3 times every 30 seconds. Because the 10 second refresh rate is the lower (i.e., faster) of the two refresh rates, the underlying metric would be computed at 0, 10, and 20 seconds. It should be noted that in other embodiments, multiple refresh rates may be involved.

In one embodiment of the present invention, the algorithm 10 may be directed to achieving at least two objectives. The first objective may be to minimize the average time for all users to receive fresh data by reducing metric computation costs. The second objective may be to incur minimal disruption when new metrics and graphs are added to the system. Accordingly, embodiments of the present invention may significantly reduce time spent on metric computation and increase the freshness of data in various data analysis programs such as real-time business analysis tools. It should be noted that even a twenty-five percent savings in calculation time, such as reducing a four minute calculation to three minutes is significant to an end-user experience when several dozen metrics are involved. Additionally, embodiments of the present invention offer an easily maintainable approximation to optimal sharing groups that improves user experience by decreasing monitor interruptions as new metrics and mappings are defined.

Specifically in regards to FIG. 1, block 12 may represent determining an effective refresh rate for each metric in a system. In one embodiment of the present invention, a user may be permitted to assign refresh rates to the metrics of supported graphs such that a monitoring system can return data (e.g., metric values) while the data is still fresh. The assigned refresh rates may then be used along with other elements relating to the present invention to determine groups of metrics that reduce system load when computed together (i.e., by running mappings that compute the metrics in sequence or parallel as permitted by infrastructure), as opposed to computing each metric independently. For example, a system for improving report computation performance in accordance with embodiments of the present invention may utilize the refresh rates, mapping costs in terms of expected computation time (e.g., in seconds), and underlying connections between metrics and mapping functions to determine metric groups or sharing groups.

Embodiments of the present invention may address problems with enumerating and comparing potential sharing groups (groups of metrics that should be computed together, by executing all the mappings required for their computation), which can be highly complex and unwieldy to manage. For example, in a system with over one-hundred metrics, even if the metrics were to be organized into just two sets, deriving an optimal sharing group could require analyzing over $2^{99}$ possibilities.

Embodiments of the present invention may include assigning values to each metric of a particular business operation. For example, block 14 may represent assigning bit values for each metric based on mapping functions that support the computation of each metric. In one embodiment of the present invention, each metric may be assigned a bit string representing the metric's connections to the underlying mapping functions. For example, a metric that relies on mappings 2 and 5 out of five mappings may be assigned the bit string 01001. In this example, the bit positions represent mappings 1-5 from left to right. However, other embodiments may incorporate different pattern assignments or bit schemes. For example, in one embodiment of the present invention mappings may be represented from right to left based on alphanumeric reference values assigned to individual mappings. In one embodiment of the present invention, the employed bit scheme may allow for maintaining a mostly undisrupted execution. Further, it should be noted that in a common case of specifying reports and adding metrics, the system-wide bit strings may remain unchanged. However, in the case of adding a mapping function and the like, the system may need to make a change to the system by adding a single bit to the end of each metric's bit value.

In embodiments of the present invention, blocks 16, 18, 20, 22, 24, 26, and 28 represent determinations regarding sharing and piggybacking. Sharing may relate to the computation of two or more metrics at the same time and piggybacking may relate to a complete overlap in mappings of at least one metric in a plurality of metrics. For example, overlap between metrics A and B means that the mappings required to compute a metric A are included in the set of mappings required to compute the another metric B. In order to identify optimal sharing groups in polynomial time, embodiments of the present invention may approximate the groups by determining optimal sharing pairs. Further, a pairwise evaluation of a certain number of metrics, n, may be employed to discover cases of piggybacking and optimal sharing intervals (e.g., chosen interval for refreshing data). It should be noted that before arriving at this evaluation, a system may have already assigned effective refresh rates to each metric as discussed previously.

In embodiments of the present invention, for each pair of metrics, a determination as to whether the pair is sharing may be made by performing a logical 'AND' of the bit values (e.g., 1 AND 1=1, 0 AND 0=0, 1 AND 0=0), as may be illustrated by block 16. For example, a logical 'AND' of two metric bit values and then a comparison of the result with 'zero' may allow for a determination in constant time of whether a potential for sharing exists between the pair of metrics (e.g., there exists at least one mapping function in common to both metrics). If the algorithm 10 determines that there is no sharing, a next pair of metrics may be processed, as illustrated in block 18. Further, in embodiments of the present invention, one of the two following methods relating to piggybacking and optimal sharing intervals may be utilized to further evaluate those pairs of metrics that have nonzero AND-ed bit values.

Block 20, in one embodiment of the present invention, may represent checking between each pair of metrics to determine whether there is complete overlap in mappings for at least one of the metrics. For example, given the set of underlying mappings A for one metric and the set of mappings B for another metric, one of three cases may be observed as follows, where ∩ is an intersection symbol: 1) A∩B=A; 2) A∩B=B; or 3) A∩B=A=B. Out of five mapping functions, a given metric i may rely on the set of mappings {1, 3, 4} and a given metric j may depend on the mapping set {3, 4}. Since {3, 4}∩{1, 3, 4}={3, 4}, the computation of B can be done without any additional time costs if run at the same time as A. The algorithm 10 may determine such cases by again performing a simple 'AND' of the two metrics' bit values and comparing the result with the original bit values.

If a piggybacking case (i.e., complete overlap of at least one metric) is determined (block 22), a piggybacking method may proceed (blocks 22 and 26). Accordingly, block 26 may represent updating deferring values and piggybacking lists for the two metrics. These lists may include all metrics that relate to a particular metric in the designated fashion. The updating process may be dependent on the original deferring values, effective refresh rates, and bit values. For example, a dependent metric, such as metric j in the case above, may be set to be deferring and then added to a piggybacking list for metric i, if metric i had not previously been set to be deferring (block 26). Because, in embodiments of the present invention, the piggybacking property is transitive and the comparison is performed on all pairs of metrics, it may be safe to discard metric j's list in the case above. It should be noted, however, that in embodiments of the present invention, piggybacking is only applicable when the dependent metric has a higher (i.e., faster) refresh rate. For example, in case 3 above, the metric with the higher refresh rate would be set to be deferring. Further, when a piggybacking case has been determined (block 22), the generic sharing case beginning at block 24 may be bypassed, as illustrated by FIG. 1.

In one embodiment of the present invention, when a piggybacking case is not determined, block 24 may represent a determination that there is a generic sharing case. Accordingly, in one embodiment of the present invention, blocks 28, 30, 32, and 34 may represent an optimal sharing interval method. An optimal sharing interval is a refresh interval that saves resources and/or computation time. Specifically, block 28 may represent determining an optimal sharing interval and an associated normalized cost savings. These determinations may be made based on effective refresh rates and mapping function costs. Block 30 may represent updating a responsibility list for the metrics, wherein updated sharing information may relate to the cost savings and the interval to be shared. Responsibility lists may contain data structures that hold an identifier of a metric to share with, a value dictating when to share, and a cost savings for sharing with the metric. Block 32 may represent adaptively refining appropriate granularities (e.g., time granularities such as hours, minutes, seconds and so forth) and levels of chaining (e.g., tracing linked information through multiple links). Further, block 32 may represent updating this information in the responsibility lists. Block 34 may represent running the scheduling system using provided data structures (i.e., effective refresh rates and responsibility lists), and given heuristics. Embodiments of the present invention relating to the abovementioned elements may become apparent in view of this disclosure.

Figure 2:
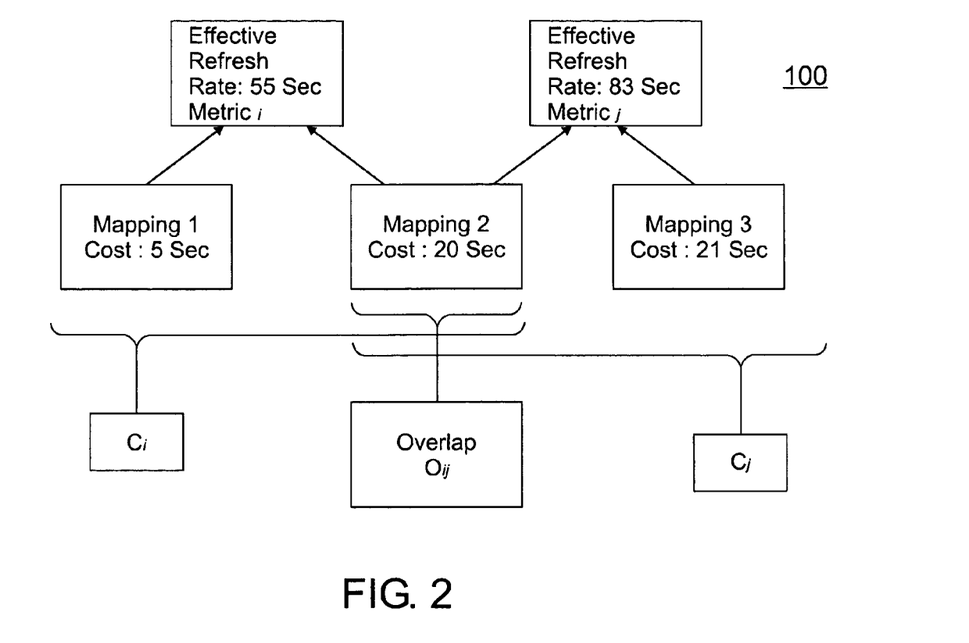
FIG. 2 is a block diagram illustrating a pair of metrics and a sequence of metric computations that correspond with the pair of metrics in accordance with embodiments of the present invention.
Figure 3:
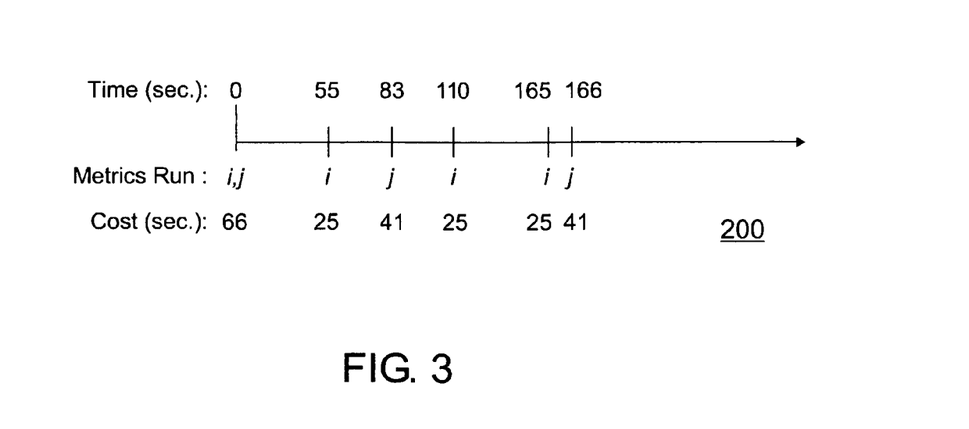
FIG. 3 is a graph illustrating a pair of metrics and a sample metric execution scheme in accordance with embodiments of the present invention.

FIGS. 2 and 3 illustrate a pair of metrics and a sequence of metric computations that correspond with the pair of metrics in accordance with embodiments of the present invention. These illustrations are generally referred to by reference numerals 100 and 200, respectively. Specifically, FIGS. 2 and 3 relate to an exemplary pair of metrics i and j, which may be utilized to demonstrate embodiments of the present invention. In one exemplary embodiment of the present invention, metrics i and j may be utilized to establish a measure of savings representing the reduction in computational costs of a sharing scheme (e.g., where two metrics are computed at the same time) over a non-sharing scheme, as presented in detail below.

First, in one embodiment of the present invention, it may be established that metrics i and j as shown in FIGS. 2 and 3 have refresh rates $r_i$ (55 seconds) and $r_j$ (83 seconds) respectively, total mapping execution costs (i.e., cost of running the function) $c_i$ (25) and $c_j$ (41) respectively, and a shared overlap $o_{ij}$. The chosen interval over which the non-sharing costs are computed may be defined as follows, where · is a dot product symbol:

$$\text{noShareInterval} = r_i \cdot r_j. \tag{1}$$

A cost of running the metrics (i.e., calculating metrics) with no sharing over the noShareInterval may be defined as:

$$\text{costNoShare} = c_i \cdot \left(\frac{r_i \cdot r_j}{r_i}\right) + c_j \cdot \left(\frac{r_i \cdot r_j}{r_j}\right) \tag{2}$$

For example, as illustrated in FIG. 2, the costNoShare over interval (55·83) may be demonstrated as follows:

$$\text{costNoShare}_{=(55\cdot83)} = 25 \cdot \left(\frac{55 \cdot 83}{55}\right) + 41 \cdot \left(\frac{55 \cdot 83}{83}\right) = 4330.$$

Additionally, an interval considered for computing sharing costs (e.g., chosen refresh interval) and a cost of running the metrics with sharing may be represented by variables sharingInterval (the interval over which sharing costs are computed, in contrast to the noShareInterval defined above) and costSharingInterval respectively. Accordingly, based on the aforementioned variables and equations, the following relationships may be derived as follows:

$$\text{savings} = \frac{\text{costNoShare} \cdot \text{sharingInterval} - \text{costSharingInterval} \cdot \text{noShareInterval}}{\text{noShareInterval} \cdot \text{sharingInterval}} \tag{3}$$

which resolves to:

$$\text{savings} = \left(\frac{\text{costNoShare}}{\text{noShareInterval}} - \frac{\text{costSharingInterval}}{\text{sharingInterval}}\right). \tag{4}$$

Assuming an arbitrary time t, is chosen for sharing, the costs over the interval t may be represented as follows: costs over interval t=(cost of running metrics i and j together the first time=$c_i$+$c_j$−$o_{ij}$)+(cost of all other computations of metric i to satisfy $r_i$ before time t)+(cost of all other computations of metric j to satisfy $r_j$ before time t). In one embodiment of the present invention, the goal is to reduce computational costs. Accordingly, in one embodiment of the present invention, metrics are not recalculated before it is time for at least one of the pair to be refreshed. Therefore, the following relationships may apply: t=n·$r_i$ or t=n·$r_j$ where n=(1, 2, 3, . . .). For example, in FIG. 2, choosing t=55 would lead to a cost=(25+41−20)+(0)+(0)=46. Further, using the equation above with noShareInterval=55·83=4565, the normalized savings would equal 1121.6.

In another embodiment of the present invention, it may be supposed that $r_j$>$r_i$ (in other words, $r_j$ is the bigger of any two pairwise intervals). Accordingly, the optimal sharing interval may occur at t=k·$r_j$ or at $$t = \left\lfloor k \cdot \frac{r_j}{r_i} \right\rfloor \cdot r_i$$

when k=1, where k represents a first interval length and the brackets represent dropping the decimal value. If two metrics had refresh rates 3 and 100, this would be t=100 (t=1·100) and t=99(t=⌊1·100/3⌋·3). These are the earliest points around which both metrics will need to be run. In fact, the closer the two metrics come to needing to be refreshed at the same time and the earlier this happens, the higher the savings. Indeed, employing just n=1 is generally a good heuristic. However, optimal intervals also occur at k>1, such as in the example in FIGS. 2 and 3. Accordingly, the savings at k=2 (i.e., twice the first interval length) with $$t = \left\lfloor 2 \cdot \frac{83}{55} \right\rfloor \cdot 55 = 165$$

are greater than those at k=1 (i.e., at the first interval length).

Figure 4:
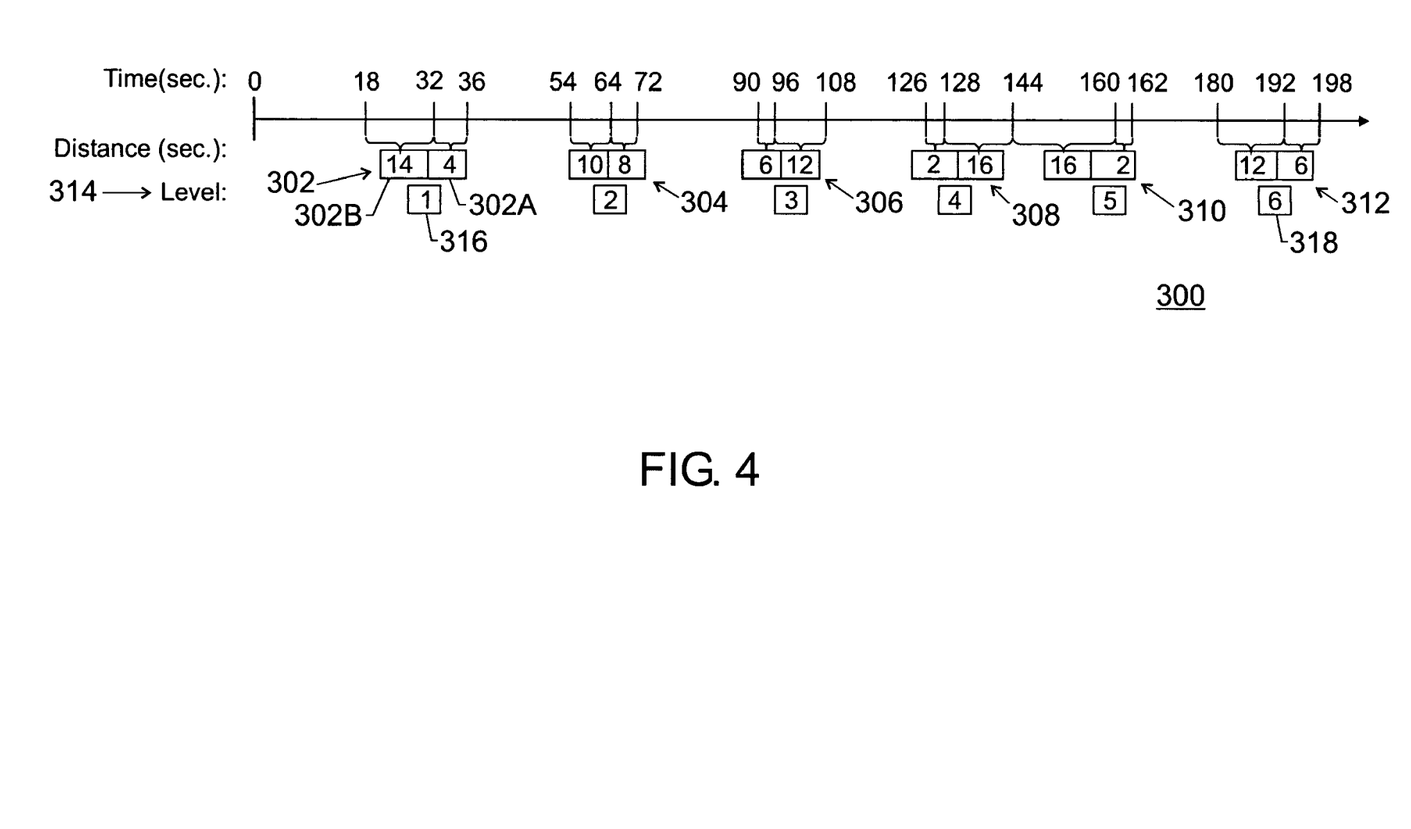
FIG. 4 is a graph illustrating a pattern for determining intervals where two metrics run at similar times in accordance with embodiments of the present invention.

FIG. 4 is a graph illustrating a pattern for determining intervals where two metrics run at similar times in accordance with embodiments of the present invention. This graph is generally referred to by reference numeral 300. Specifically, FIG. 4 illustrates two refresh rates. The first refresh rate is 18 seconds and the second refresh rate is 32 seconds. In one example, FIG. 4 may demonstrate a pattern for finding the values of t at which two metrics are relatively close to being refreshed at the same times (e.g., times 126 and 128 are within 2 of one another and thus may be considered close). By considering the multiples of the larger refresh rate alone, it may be observed in the illustrated example that the distances to the closest computation times of the metric with the lesser refresh rate inverts by values (14, 4) as determined at the first multiple, as referenced by reference numeral 302. The right-hand difference (e.g., 302A) increases by 4 while the left-hand difference (302B) decreases by 4 until it can go no further before becoming negative, as illustrated in the progression of blocks 304, 306, and 308. At this inversion transition, the right-hand difference then decreases by 14 while the left-hand increases by 14 until it can go no further without exceeding 18 (i.e., 14+4), as illustrated in the progression of blocks 308, 310, and 312. This pattern continues and allows for jumping directly to the multiples of the larger refresh rate, where the inversion transitions are about to occur. These inversion transitions signify those values of t at which two metrics are relatively close. Accordingly, each inversion transition may be deemed a level 314 and such level designation may begin at 0. For example, level 1 is designated by reference numeral 316 and level 6 is designated by reference numeral 318. For each transition beyond the first, the level is incremented. This may be used to determine whether to continue searching for optimal sharing intervals as illustrated by the following equation.

$$adjustedSavings = \frac{previousSavings}{n^{level}}. \quad (5)$$

Equation (5) represents a comparison between savings for the current level and savings for the previous level, where n represents an iteration counter and Level represents a level value (see e.g., reference numeral 316):

Calculation may continue if the previousSavings (e.g., savings computed at level—1) are less than the adjustedSavings calculated for the current level and where n=(1, 2, 3, . . .) or n=(2, 4, 6, . . .) and so forth based on a user's perceived needs. Otherwise, an optimal interval may have been found. If a user prefers that the iteration come to a rapid end, the user may increase the increments for n such that improved savings are more difficult to find and the iteration will end more quickly. For example, if every iteration increases the value of n by one the adjusted savings will have to be increasingly greater in order to continue.

Once an optimal interval is found, the information may be recorded using responsibility lists. For example, letting k·$r_j$ where k=(1, 2, 3, . . .) be the interval of sharing, metric j would go into metric i's responsibilityBy list while metric i would go into metric j's responsibilityFor list. As discussed previously, these lists may contain data structures that hold an identifier of a metric to share with, a value dictating when to share, and a cost savings for sharing with the metric. Further, the data structures may be sorted in descending order based on cost savings.

Figure 5:
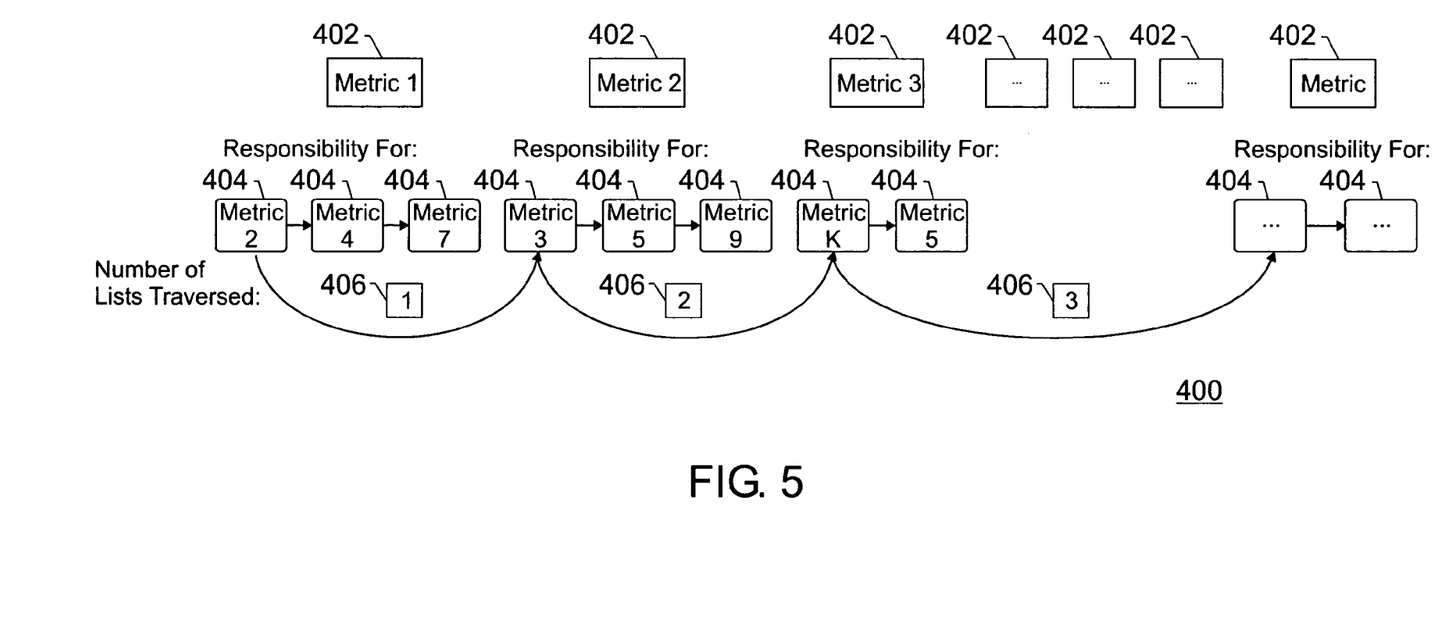
FIG. 5 is a diagram illustrating an issue related to chaining or tracing linked information in accordance with embodiments of the present invention.

FIG. 5 is a diagram illustrating an issue related to chaining or tracing linked information in accordance with embodiments of the present invention. This diagram may generally be referred to by reference numeral 400. Specifically, FIG. 5 relates to following chains of responsibilityFor lists and how far the chains should be followed. The blocks designated by reference number 402 represent metrics and the blocks designated by reference number 404 represent metrics in the responsibilityFor list of each respective metric 402. After pairwise evaluation is complete, several possible heuristics may be applied to the assembled data structures before runtime. A goal of these heuristics may be to transform the optimal pairs into optimal variable-sized sharing groups with minimal processing and complexity. Along the lines of this transformation lies the issue of chaining (e.g., how far we traverse in the chain of responsibilityFor lists) as shown in FIG. 5. For example, each block 406 represents the number of lists traversed in the chain. The algorithm 10 may approximate this by employing a combination of three methods.

A first method, in accordance with embodiments of the present invention, may ensure that metric i is not computed too often. This may be desirable, for example, if metric i is in several other metrics' responsibilityFor lists. Accordingly, in the first method, for any metric i involved in sharing, the metric j associated with the highest savings in i's responsibleBy list may be deemed the sole metric responsible for concurrently computing i in cases of sharing.

In a second method, sufficient levels of chaining may be adaptively discovered during preprocessing steps and/or during runtime in accordance with embodiments of the present invention. For example, in a case where values are assigned for each item in a metric's responsibilityFor list, a metric y may be in a metric x's responsibilityFor list such that when metric x runs, metric y should run concurrently. A system may look into metric y's responsibilityFor list as well, and for each item a chaining value of true is observed, the associated metric in the item may be run and its responsibilityFor list analyzed. Before deploying the system, preliminary chaining values may be assigned, tested, and adapted to reduce overall system computation. During runtime, the system may also track and compare different chaining values on the load of the system, which can be especially useful when there is noticeable delay on top of computation time (e.g., network latency). Both of these courses may aim to better approximate optimal sharing groups in large systems. Additionally, it should be noted that the algorithm 10 can assign chaining values at various granularities.

In a third method, in accordance with embodiments of the present invention, deferring metrics are always computed when the appropriate metrics they defer to are run. Further, this method may be applied regardless of the chaining scheme.

Figure 6:
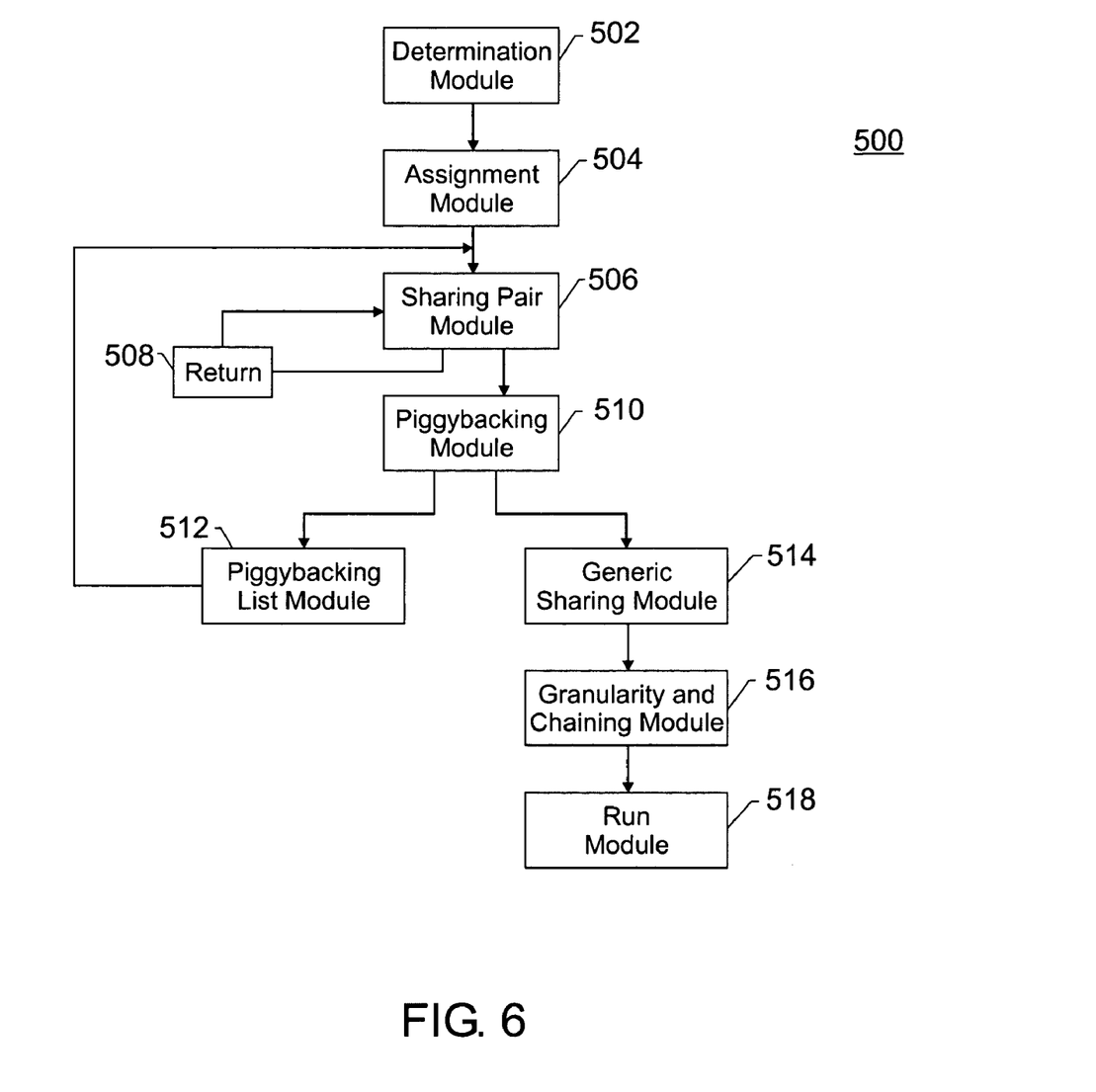
FIG. 6 is a diagram illustrating a system in accordance with embodiments of the present invention.

FIG. 6 is a diagram illustrating a system in accordance with embodiments of the present invention. This diagram is generally referred to by the reference numeral 500. While FIG. 6 separately delineates specific modules, in other embodiments, individual modules may be split into multiple modules or multiple modules may be combined into a single module. Additionally, in some embodiments of the present invention, the modules in the illustrated diagram 500 do not necessarily operate in the illustrated order. Further, individual modules and components may represent hardware, software, or some combination of the two.

Block 502 is a determination module for determining a metric refresh rate. Block 504 is an assignment module for assigning a value to a metric. Block 506 is a sharing pair module for resolving sharing pairs of metrics. Block 508 represents a return for processing a next pair of modules if no sharing pair is determined. Block 510 is a piggybacking module for determining whether piggybacking exists. Block 512 is a piggybacking list module for updating a list when piggybacking exists. Block 514 is a generic sharing module for determining an optimal sharing interval, cost savings, and updating a list when there is generic sharing. Block 516 is a granularity and chaining module for refining granularity and chaining. Block 518 is a run module for running a scheduling system.

Figure 7:
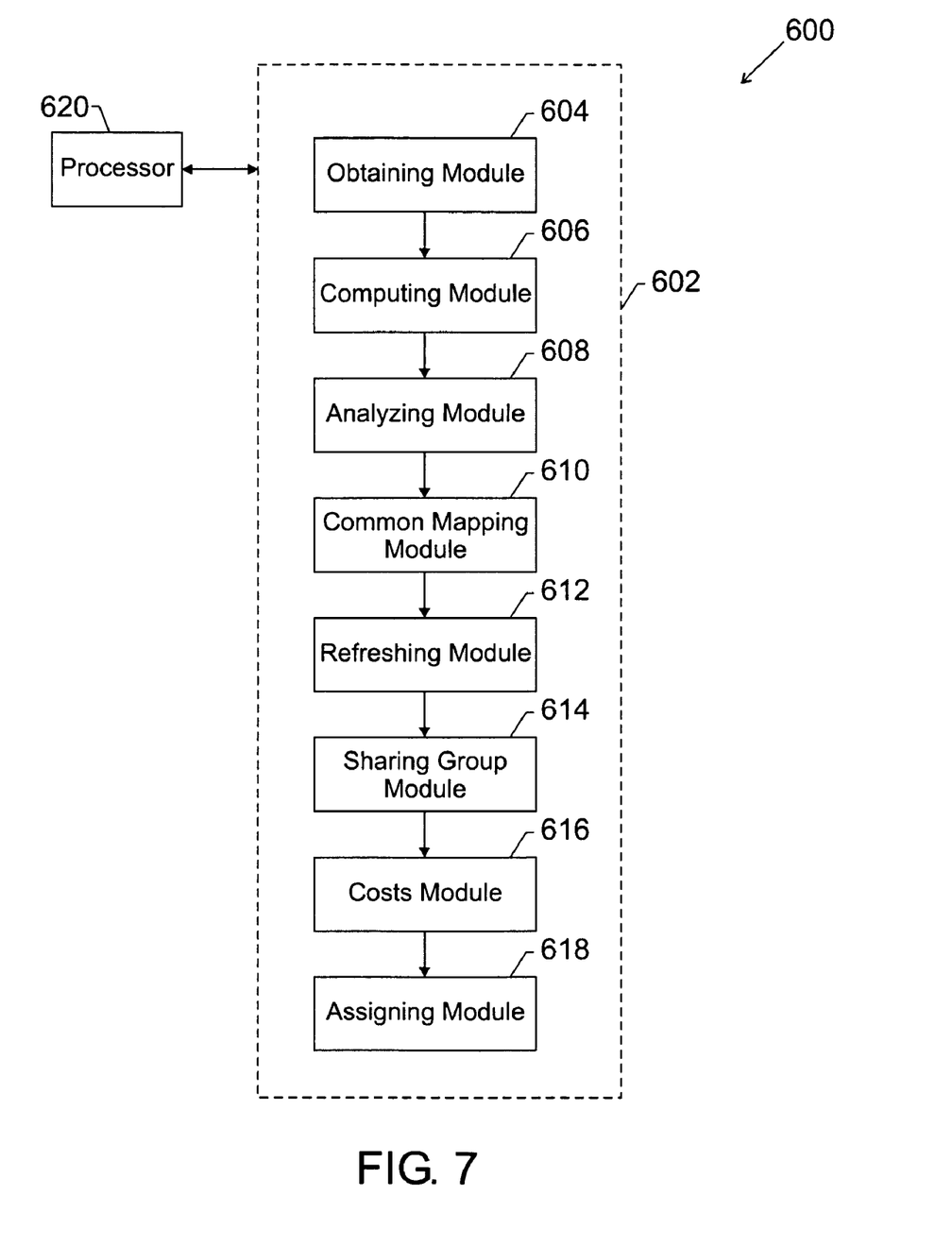
FIG. 7 is a block diagram illustrating a system and method in accordance with embodiments of the present invention.

FIG. 7 is a block diagram illustrating a system and method in accordance with embodiments of the present invention. This diagram is generally referred to by the reference numeral 600. While FIG. 7 separately delineates specific modules, in other embodiments, individual modules may be split into multiple modules or multiple modules may be combined into a single module. Additionally, in some embodiments of the present invention, the modules in the illustrated algorithm 600 do not necessarily operate in the illustrated order. Those skilled in the art will appreciate that the modules may comprise hardware, software or some combination of both.

FIG. 7 comprises blocks 604, 606, 608, 610, 612, 614, and 616. These blocks may represent hardware, software or some combination of both. Additionally, as one of ordinary skill in the art will appreciate, these modules may be stored on a tangible medium (602) such as a CD, diskette, or hard drive. Block 604 may represent a module for obtaining a plurality of data elements comprising information about a process. Block 606 may represent a module for computing a plurality of metrics (each having a refresh rate) from a plurality of mappings relating to an operation on at least one of the plurality of data elements. Block 608 may represent a module for analyzing the refresh rate of the plurality of metrics to identify at least one shared refresh interval between groups of the plurality of metrics. Block 610 may represent a module for identifying at least one common mapping between the plurality of metrics. Block 612 may represent a module for periodically refreshing the plurality of metrics, accounting for at least one shared refresh interval and at least one common mapping between the plurality of metrics. Block 614 may represent a module or group module for identifying a plurality of sharing groups, each of the plurality of sharing groups comprising at least one of the plurality of metrics, wherein each of the plurality of metrics shares at least one common mapping. Block 616 may represent a module for accounting for mapping costs in terms of expected computation time when periodically refreshing the plurality of metrics. Block 618 may represent a module for assigning a metric a bit string comprising a plurality of bits each representing one of a plurality of related mapping functions and demonstrating a relationship between the metric and one of the plurality of mapping functions. It should be noted that these modules may operate with a processor based system, as illustrated by block 620.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A processor-based method of refreshing metrics, comprising:
   obtaining a plurality of data elements that comprise information about a process;
   computing a plurality of metrics from a plurality of mappings, each of the plurality of mappings relating to an operation on at least one of the plurality of data elements, each of the plurality of metrics having a refresh rate;
   analyzing the refresh rate of the plurality of metrics to identify at least one shared refresh interval between groups of the plurality of metrics;
   identifying at least one common mapping between the plurality of metrics; and
   periodically refreshing the plurality of metrics, accounting for the at least one shared refresh interval and the at least one common mapping between the plurality of metrics to reduce computation costs.

2. The method of claim 1, comprising identifying a plurality of sharing groups, each of the plurality of sharing groups comprising at least one of the plurality of metrics, wherein each of the plurality of metrics shares at least one common mapping.

3. The method of claim 1, comprising accounting for mapping costs in terms of expected computation time when periodically refreshing the plurality of metrics.

4. The method of claim 1, comprising:
   assigning a first value to a first metric of the plurality of metrics, the first value corresponding to at least one mapping used for computing the first metric;
   assigning a second value to a second metric of the plurality of metrics, the second value corresponding to at least one mapping used for computing the second metric; and
   comparing the first value and the second value to identify the at least one common mapping.

5. The method of claim 1, comprising defining a responsibility list relating to one of a first metric and a second metric, the responsibility list comprising an identifier that designates a one of the plurality of metrics to incorporate with the first metric in a sharing scheme.

6. The method of claim 4, comprising defining a responsibility list relating to one of the first metric and the second metric, the responsibility list comprising a share identifier that designates when to share in the sharing scheme.

7. The method of claim 1, comprising identifying a complete overlap of the second metric by the first metric.

8. The method of claim 7, comprising assigning the second metric to the responsibility list relating to the first metric.

9. The method of claim 4, comprising assigning a first bit string value to the first metric and a second bit string value to the second metric, wherein each bit in the first and second bit string values represents a particular connection between the first and second metrics and respective mapping functions.

10. The method of claim 1, comprising refining a granularity of a refresh rate to facilitate identification of the at least one shared refresh interval.

11. The method of claim 1, comprising assigning to a metric a bit string comprising a plurality of bits, wherein each bit in the bit string represents one of a plurality of related mapping functions and each bit demonstrates a relationship between the metric and one of the plurality of mapping functions.

12. A system for refreshing metrics, comprising:
  a data module, the data module adapted to obtain a plurality of data elements that comprise information about a process;
  a computation module, the computation module adapted to compute a plurality of metrics from a plurality of mappings, each of the plurality of mappings relating to an operation on at least one of the plurality of data elements, each of the plurality of metrics having a refresh rate;
  an analysis module, the analysis module adapted to analyze the refresh rate of the plurality of metrics to identify at least one shared refresh interval between groups of the plurality of metrics;
  an identification module, the identification module adapted to identify at least one common mapping between the plurality of metrics; and
  a refresh module, the refresh module adapted to periodically refresh the plurality of metrics, accounting for the at least one shared refresh interval and the at least one common mapping between the plurality of metrics.

13. The system of claim 12, comprising a group module adapted to identify a plurality of sharing groups, each of the plurality of sharing groups comprising at least one of the plurality of metrics, wherein each of the plurality of metrics shares at least one common mapping.

14. The system of claim 12, comprising an accounting module adapted to account for mapping costs in terms of expected computation time when periodically refreshing the plurality of metrics.

15. The system of claim 12, comprising a bit string module adapted to assign a metric a bit string comprising a plurality of bits, wherein each bit in the bit string represents one of a plurality of related mapping functions and each bit demonstrates a relationship between the metric and one of the plurality of mapping functions.

16. A computer program for refreshing metrics, comprising:
  a tangible medium;
  a data module stored on the tangible medium, the data module adapted to obtain a plurality of data elements that comprise information about a process;
  a computation module stored on the tangible medium, the computation module adapted to compute a plurality of metrics from a plurality of mappings, each of the plurality of mappings relating to an operation on at least one of the plurality of data elements, each of the plurality of metrics having a refresh rate;
  an analysis module stored on the tangible medium, the analysis module adapted to analyze the refresh rate of the plurality of metrics to identify at least one shared refresh interval between groups of the plurality of metrics;
  an identification module stored on the tangible medium, the identification module adapted to identify at least one common mapping between the plurality of metrics; and
  a refresh module stored on the tangible medium, the refresh module adapted to periodically refresh the plurality of metrics, accounting for the at least one shared refresh interval and the at least one common mapping between the plurality of metrics.

17. The computer program of claim 16, comprising a group module stored on the tangible medium, the group module adapted to identify a plurality of sharing groups, each of the plurality of sharing groups comprising at least one of the plurality of metrics, wherein each of the plurality of metrics shares at least one common mapping.

18. The computer program of claim 16, comprising an accounting module stored on the tangible medium, the accounting module adapted to account for mapping costs in terms of expected computation time when periodically refreshing the plurality of metrics.

19. The system of claim 16, comprising a bit string module stored on the tangible medium, the bit string module adapted to assign a metric a bit string comprising a plurality of bits, wherein each bit in the bit string represents one of a plurality of related mapping functions and each bit demonstrates a relationship between the metric and one of the plurality of mapping functions.

20. A system for refreshing metrics, comprising:
  means for obtaining a plurality of data elements that comprise information about a process;
  means for computing a plurality of metrics from a plurality of mappings, each of the plurality of mappings relating to an operation on at least one of the plurality of data elements, each of the plurality of metrics having a refresh rate;
  means for analyzing the refresh rate of the plurality of metrics to identify at least one shared refresh interval between groups of the plurality of metrics;
  means for identifying at least one common mapping between the plurality of metrics; and
  means for periodically refreshing the plurality of metrics, accounting for the at least one shared refresh interval and the at least one common mapping between the plurality of metrics.

21. The system of claim 20, comprising means for identifying a plurality of sharing groups, each of the plurality of sharing groups comprising at least one of the plurality of metrics, wherein each of the plurality of metrics shares at least one common mapping.

22. The system of claim 20, comprising means for accounting for mapping costs in terms of expected computation time when periodically refreshing the plurality of metrics.

23. The system of claim 20, comprising means for assigning a metric a bit string comprising a plurality of bits, wherein each bit in the bit string represents one of a plurality of related mapping functions and each bit demonstrates a relationship between the metric and one of the plurality of mapping functions.

* * * * *

UNITED STATES PATENT AND TRADEMARK OFFICE
CERTIFICATE OF CORRECTION

PATENT NO. : 7,236,938 B2
APPLICATION NO. : 10/915810
DATED : June 26, 2007
INVENTOR(S) : Eric Shan et al.

It is certified that error appears in the above-identified patent and that said Letters Patent is hereby corrected as shown below:

In column 6, line 24, delete "$costNoShare =_{(55.85)}$" and insert
-- $costNoShare_{(55.85)}$ --, therefor.

Signed and Sealed this

Twenty-eighth Day of April, 2009

JOHN DOLL
*Acting Director of the United States Patent and Trademark Office*